United States Patent
Mak et al.

(10) Patent No.: US 8,120,856 B2
(45) Date of Patent: Feb. 21, 2012

(54) METHOD FOR MANUFACTURING POLYMER MINIATURE LENS

(75) Inventors: Wingkeung Mak, HongKong (CN); Tinhoi Siu, HongKong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 12/662,534

(22) Filed: Apr. 21, 2010

(65) Prior Publication Data

US 2011/0194186 A1  Aug. 11, 2011

(30) Foreign Application Priority Data

Feb. 10, 2010  (CN) .......................... 2010 1 0117717

(51) Int. Cl.
G02B 27/10  (2006.01)
G02B 3/00  (2006.01)
B29D 11/00  (2006.01)

(52) U.S. Cl. .................. 359/619; 264/1.32; 264/1.1

(58) Field of Classification Search ............... 264/1.1, 264/1.32; 430/270.1; 359/619
See application file for complete search history.

(56) References Cited

U.S. PATENT DOCUMENTS

2004/0012857 A1* 1/2004 Uchiyama et al. ............ 359/619
2010/0233616 A1* 9/2010 Kobayashi et al. ........ 430/270.1

* cited by examiner

*Primary Examiner* — William Choi
(74) *Attorney, Agent, or Firm* — Nixon & Vanderhye PC

(57) ABSTRACT

A method for manufacturing a polymer miniature lens on a substrate with the lens forming pattern, and the liquid polymer is dispensed therein. The lens forming pattern having a periphery area and an interior area, most portion of the periphery area having a property of confining liquid polymer, while the interior area having at least one portion exposing the surface of the substrate; depositing liquid polymer onto the lens forming pattern; and curing the liquid polymer after the liquid polymer reaches equilibrium shape and is confined to the periphery area. The invention also discloses a collimator including the polymer miniature lens.

6 Claims, 13 Drawing Sheets

|  | 1-surface | 2-surface |
|---|---|---|
| Epoxy 1 refractive index | 1.50 | 1.55 |
| Epoxy 2 refractive index | - | 1.45 |
| Glass refractive index | 1.50 | 1.50 |
| Ray angle | ±17.5 | ±17.5 |
| $R1_{optimized}$ | 0.692 | 0.879 |
| $R2_{optimized}$ | - | 0.670 |
| Collimation error (deg)* | 1.55 | 1.04 |

| | lens forming pattern (um) | polymer miniature lens (um) | Max. deviation (um) |
|---|---|---|---|
| Lens #1 | 352.0 | 349.1 | 2.9 |
| Lens #2 | 352.0 | 349.1 | 2.9 |
| Lens #3 | 352.0 | 350.5 | 1.5 |
| Lens #4 | 351.5 | 350.5 | 1 |
| Lens #5 | 352.0 | 350.5 | 1.5 |
| Lens #6 | 351.5 | 350.5 | 1 |
| Lens #7 | 351.5 | 350.5 | 1 |
| Lens #8 | 352.0 | 350.5 | 1.5 |
| Lens #9 | 352.0 | 350.5 | 1.5 |
| Lens #10 | 352.0 | 349.1 | 2.9 |

FIG.13

|  | Before reflow | | | After reflow | | |
| --- | --- | --- | --- | --- | --- | --- |
|  | polymer diameter (um) | polymer Thickness (um) | Radius of Curvature (um) | polymer diameter (um) | polymer Thickness (um) | Radius of Curvature (um) |
| Lens #A | 349.1 | 53.7 | 315.2 | 349.1 | 53.7 | 312.1 |
| Lens #B | 349.1 | 53.2 | 316.2 | 350.5 | 52.6 | 315.8 |
| Lens #C | 350.5 | 53.3 | 309.9 | 350.5 | 52.9 | 311.3 |
| Lens #D | 350.5 | 58.0 | 296.3 | 351.0 | 57.3 | 299.1 |
| Lens #E | 350.5 | 54.2 | 309.0 | 350.5 | 54.4 | 308.5 |
| Lens #F | 350.5 | 58.0 | 291.7 | 349.1 | 59.0 | 293.5 |
| Lens #G | 350.5 | 58.9 | 290.6 | 350.5 | 58.9 | 289.4 |
| Lens #H | 349.1 | 61.6 | 280.8 | 350.5 | 62.1 | 282.3 |

FIG.14

METHOD FOR MANUFACTURING POLYMER MINIATURE LENS

This application claims priority to Chinese Application No. 201010117717.06 filed Feb. 10, 2010, the entire contents of which are hereby incorporated by reference.

FIELD OF THE INVENTION

The present invention relates to the optical imaging field, and more particularly, to a method for manufacturing a polymer miniature lens and a collimator incorporating the polymer miniature lens.

BACKGROUND OF THE INVENTION

An advanced optoelectronic (OE) transceiver necessarily comprises semiconductor lasers, photo-detectors and electronics which are in a small package form, in order to support high speed communications. A typical transceiver module consists of multiple above-mentioned OE components which are precisely aligned to lens or lens array in sending and receiving light via external optics, like optical fiber connector. The OE component requires high precision assembly process to improve product manufacturability and to meet target cost. The inherent challenge with OE component design lies in maintaining the optical alignment between external optics and the optoelectronic emitters and receivers and product reliability. A promising optical design to overcome the challenge is using a collimator to collimate light beams. The advantage is that the mechanical alignment tolerant between optoelectronic emitters and receivers of the OE component and external optics can be relaxed. As a result, traditional expensive precision fiber connector commonly used to secure optical alignment can be avoided.

Referring to FIGS. 1-2, FIG. 1a is an illustration of a panel form package 1 includes a plurality of OE components 11 that can make collimated light beam. FIG. 1b shows an individual OE component 11, and the arrows in FIG. 1b represent the direction of the in/out optical light beams. FIG. 2 is a schematic view of a collimator set in the OE component 11. The collimator 21 is employed to convert the diverging light emitted from the laser diode 22 into parallel light beam, the size range of the collimator 21 is commonly 100-1000 um.

Traditional micro-lens manufacturing methods are deployed in making micro-lens directly onto the optoelectronic wafer or transparent substrate to integrate with the final product. With the advancement of glass material science and process control, methods including high temperature glass molding and etching the substrate made of glass or semiconductor can be used to provide micro-lens on glass substrate directly that endures high temperature assembly process such as soldering and SMT reflow process. Nevertheless, the material cost and the manufacturing cost for both technologies are considerable high. And reflowing technique fails to produce accurate collimator of larger size in meeting OE module application.

Recently, ink-jetting technology is applied to manufacture micro-lenses array onto substrate by direct dispensing. This method is made possible by combining precision volume dispensing control by either piezoelectric or micromechanical control. Although the position of micro-lens decided by ink-jetting method is with high precision, the dimension and shape of the micro-lens is in turn determined by the dispensing volume and its surface tension to reach equilibrium profile on the substrate. One of the methods for manufacturing the micro-lens is to deposit a layer onto the substrate, so a well shape pattern is left for forming the micro-lens, but the disadvantage thereof is that the edge of micro-lens is not good. Another method for manufacturing the micro-lens is dispensing liquid onto an area of the substrate so as to be wettable. That is to say, a wettable layer in a disk shape is deposited on the substrate, and the micro-lens is mounted on the layer. However, the disadvantage is that the micro-lens does not contact with the substrate directly, so the micro-lens can not be mounted on the substrate reliably, and the transparency of the micro-lens may not be so good. Furthermore, this approach has numbers of requirements on the substrate material, surface treatment, as well as the lens forming material according to its working principle. The potential application is severely limited owing to narrow range of choice of process and materials.

Accordingly, a need has arisen for providing an improved method for manufacturing polymer miniature lenses on a substrate for the collimator, to overcome the above-mentioned drawbacks.

SUMMARY OF THE INVENTION

One objective of the present invention is to provide a method for manufacturing a polymer miniature lens on a substrate by forming a lens forming pattern on the substrate, with the lens forming pattern having a property of confining liquid polymer and reliable contact surface, thereby the position and dimension of the polymer miniature lens are precisely controlled, and the reliability and the transparency of the polymer miniature lens are improved.

Another objective of the present invention is to provide a collimator which has lens forming patterns formed on the substrate, with each lens forming pattern having a property of confining liquid polymer and reliable contact surface, thereby the position and dimension of the polymer miniature lens are precisely controlled, and the reliability and the transparency of the collimator are improved.

To achieve the above-mentioned objects, the present invention provides a method for manufacturing a polymer miniature lens on a substrate which has a lens forming pattern to liquid polymer, the lens forming pattern consists of a periphery area and an interior area that is the exposed substrate. Depositing liquid polymer onto the lens forming pattern; and curing the liquid polymer after the liquid polymer reaches equilibrium shape and is confined to the periphery area; whereby the perimeter of the polymer miniature lens is defined by the periphery area. The interior exposed substrate surface area forms a reliable surface contact with the polymer miniature lens for higher optical transmission and better lens to substrate reliability.

As an embodiment of the present invention, the lens forming pattern is a photoresist ring which has an outer boundary, an inner boundary, and an open hole defined by the inner boundary, said periphery area is the area between the outer boundary and the inner boundary, and said interior area is the open hole.

As another embodiment of the present invention, the lens forming pattern comprises a step of forming a semi-transparent pattern or a spatial filtering pattern in the open hole of the lens forming pattern to build additional functions to the lens, namely attenuation and selective filtering of the transmitted light.

As another embodiment of the present invention, the liquid polymer comprises a first kind of liquid polymer and a second kind of liquid polymer, and the steps of depositing liquid polymer onto the lens forming pattern and curing the liquid polymer is performed by: depositing the first kind of liquid polymer in the open hole of the photoresist ring; curing the first kind of liquid polymer after the first kind of liquid polymer reaches equilibrium shape and is confined to the inner boundary; depositing the second kind of liquid polymer onto the first kind of polymer and the entire photoresist ring; and curing the second kind of liquid polymer after the second kind of liquid polymer reaches equilibrium shape and is confined to the outer boundary. With different refractive index of the first kind of liquid polymer and second kind of liquid polymer, and forming two curvature surfaces on the rings, spherical aberration of the resultant lens can be reduced comparing to that by using one curvature and hence to form a better collimated beam.

As still another embodiment of the present invention, the lens forming pattern is annulus shape with at least a notch formed therein.

As another embodiment of the present invention, the lens forming pattern is disk shape with a plurality of through holes formed therein.

As yet another embodiment of the present invention, the lens forming pattern is formed by modifying the substrate surface texture or wettability against the liquid polymer.

As still another embodiment of the present invention, the lens forming pattern is a layer of material applied onto the substrate by lithography process, stencil printing, silk printing, or stamp printing.

As yet another embodiment of the present invention, the polymer is light curable epoxy, silicone, or elastomer.

A collimator comprises: at least one lens forming pattern formed on the surface of the substrate, each lens forming pattern having a periphery area and an interior area, most portion of the periphery area having a property of confining liquid polymer, while the interior area having at least one portion exposing the surface of the substrate; at least one polymer lens formed on the lens forming pattern respectively, the perimeter of the polymer lens being defined by the periphery area, and the polymer lens directly contacting with the better adhesion substrate surface through the interior area.

In comparison with the prior art, the lens has lens forming patterns formed on the substrate, with each lens forming pattern having a property of confining liquid polymer and having at least one portion exposing the surface of the substrate, thereby the position and dimension of the polymer lens are precisely controlled, and the reliability and the transparency of the lens are improved.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b a schematic illustration of an individual OE component of the typical transceiver module shown in FIG. 1a;

FIG. 13 is a parameter table associated with the diameter deviation of the polymer miniature lenses of the collimator from the lens forming pattern;

FIG. 14 is a parameter table associated with the polymer miniature lenses of the collimator before and after the reflow process.

DETAILED DESCRIPTION OF ILLUSTRATED EMBODIMENTS

Figure 1A:
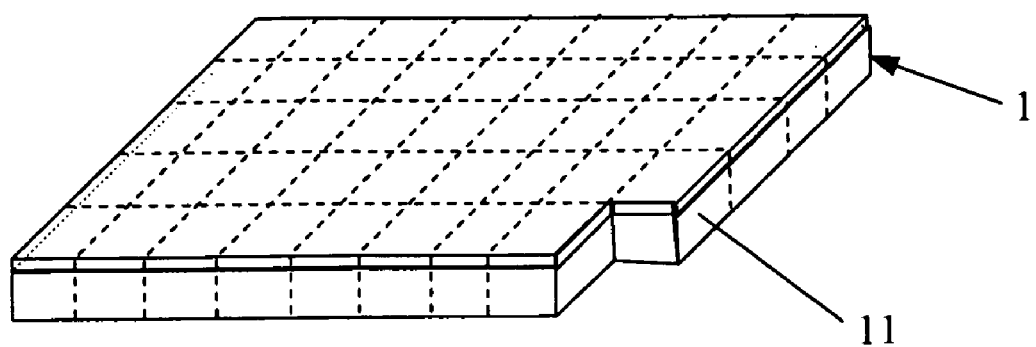
FIG. 1a is a schematic illustration of typical panel form packaging including multiple individual OE components.
Figure 1B:
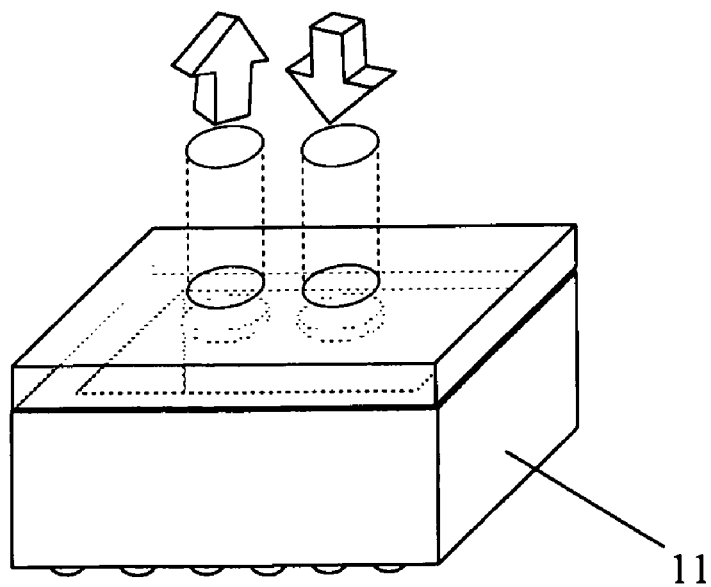
Figure 2:
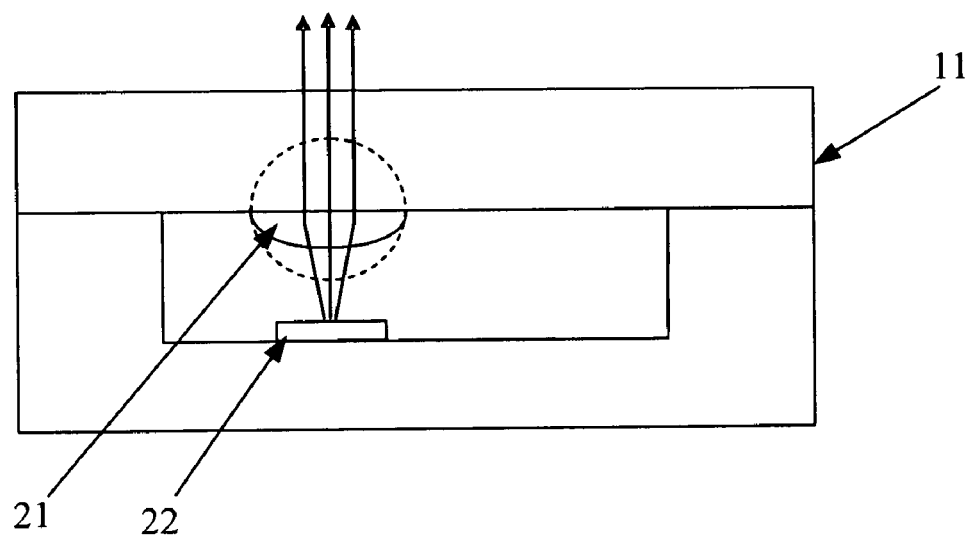
FIG. 2 is a schematic illustration of a collimator set in the OE component.

Various preferred embodiments of the invention will now be described with reference to the figures, wherein like reference numerals designate similar parts throughout the various views.

Figure 3:
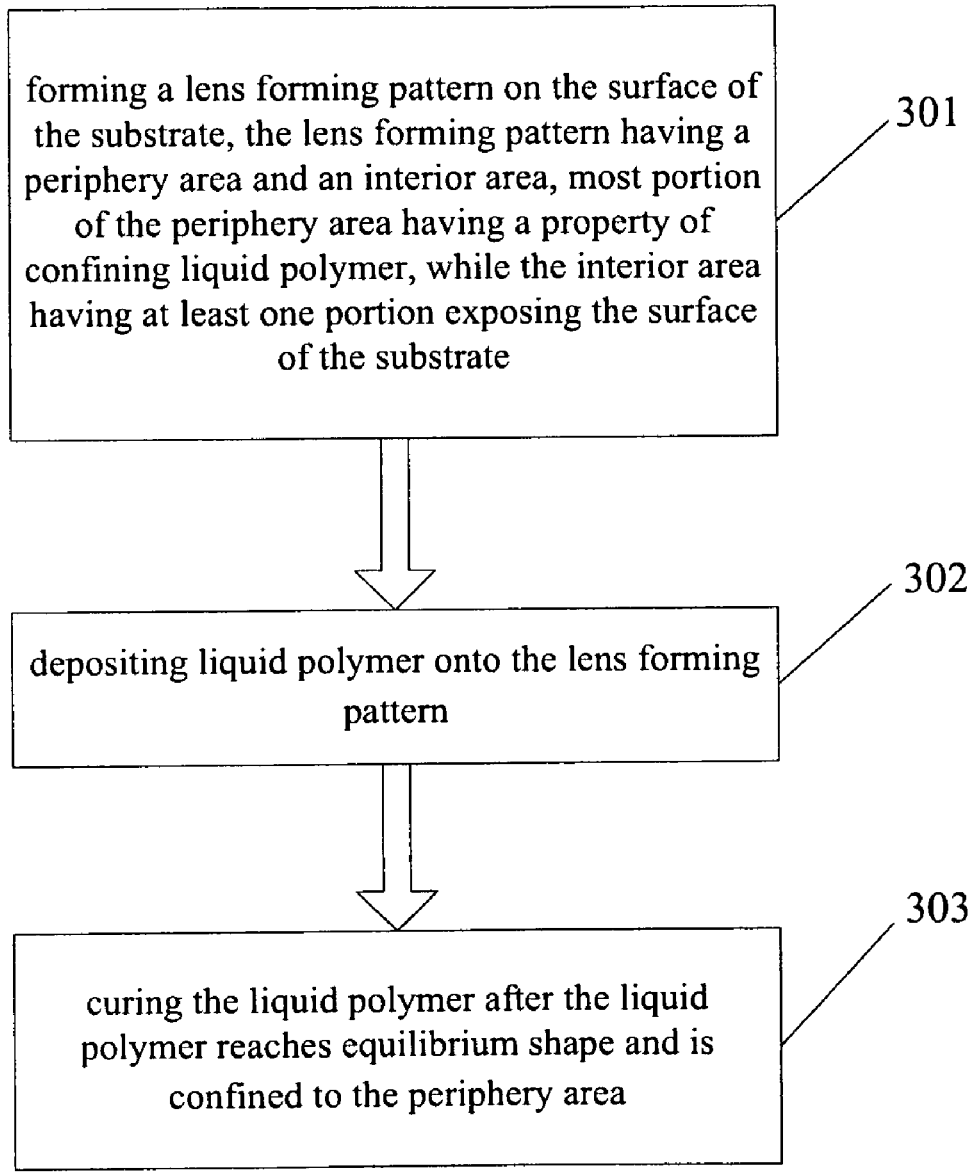
FIG. 3 is a flow chart illustrating a method for manufacturing a polymer miniature lens on a substrate according to an embodiment of the invention.

As indicated above, the invention is directed to a method for manufacturing a polymer miniature lens on a substrate. Referring to FIG. 3, a method for manufacturing the polymer miniature lens comprises steps of: forming a lens forming pattern on the surface of the substrate, the lens forming pattern having a periphery area and an interior area, most portion of the periphery area having a property of confining liquid polymer, while the interior area having at least one portion exposing the surface of the substrate (step 301); depositing liquid polymer onto the lens forming pattern (step 302); curing the liquid polymer after the liquid polymer reaches equilibrium shape and is confined to the periphery area (step 303).

Figure 4A:
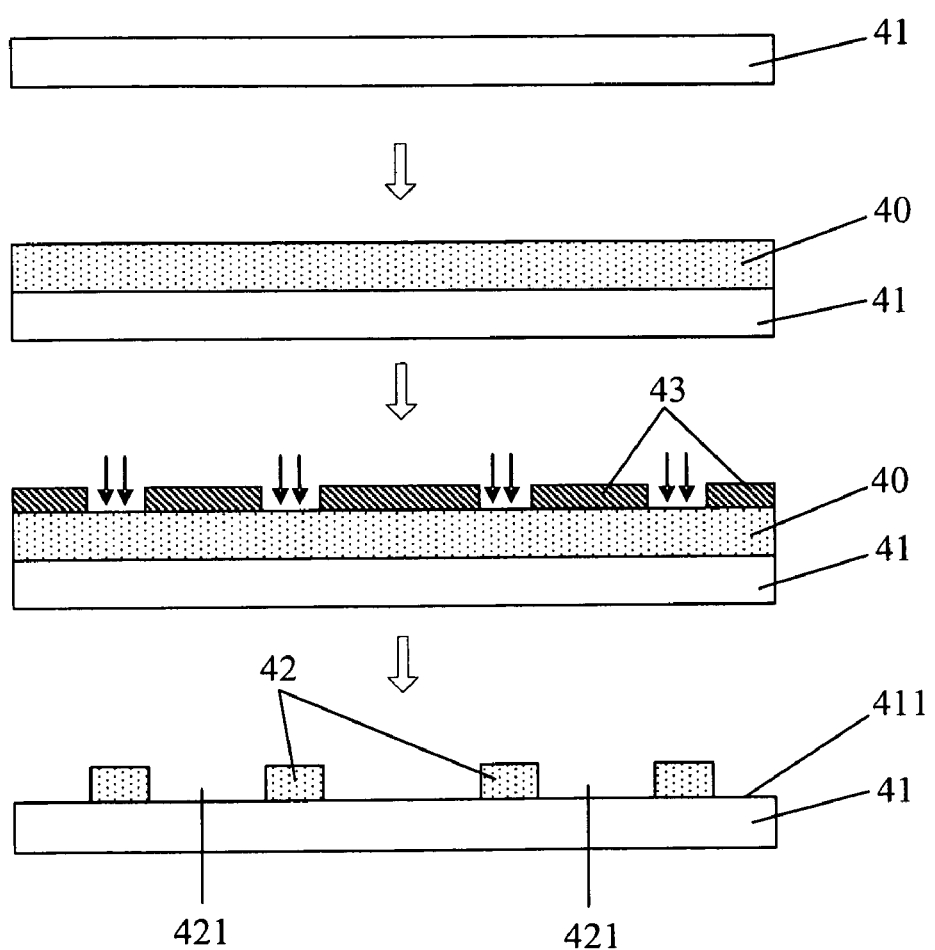
FIG. 4a is sequence diagram illustrating a process of forming lens forming patterns onto a substrate.
Figure 4B:
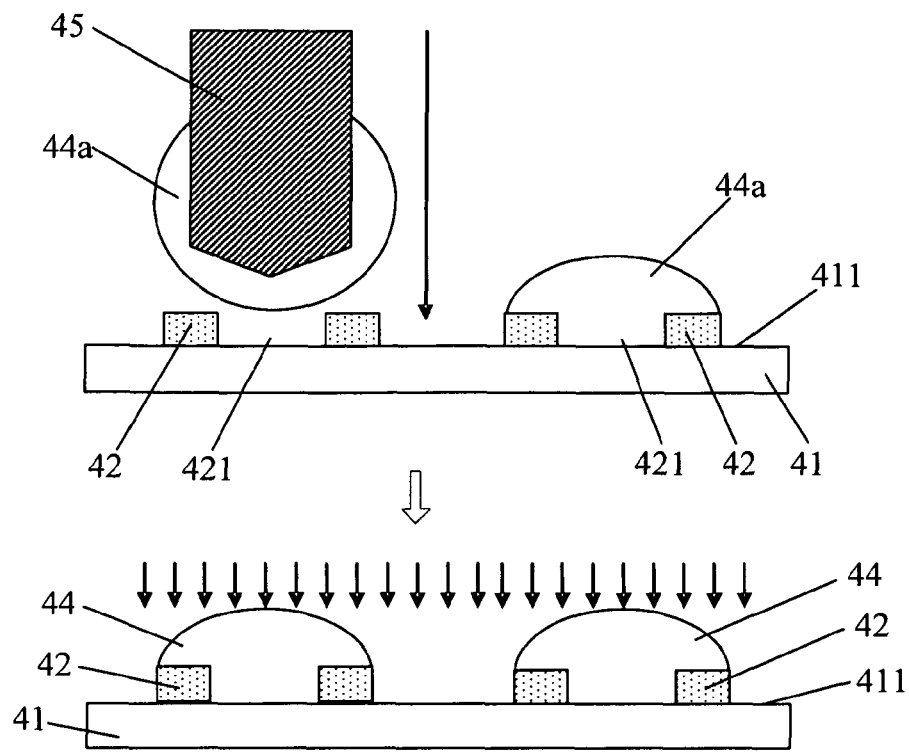
FIG. 4b is sequence diagram illustrating a process of depositing liquid polymer onto the lens forming patterns and curing the liquid polymer.
Figure 4C:
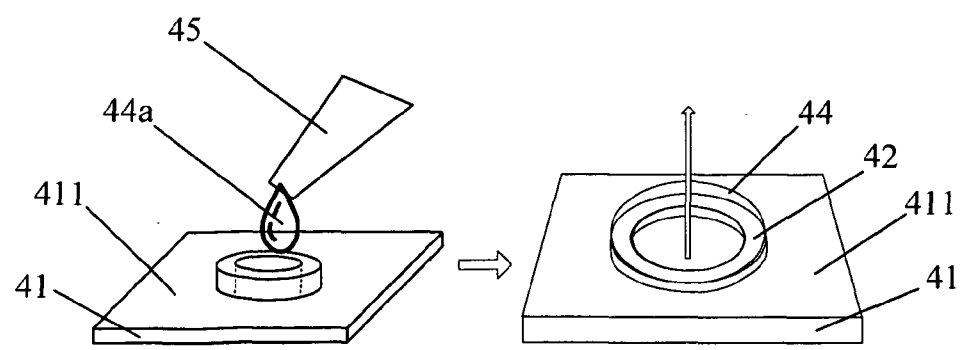
FIG. 4c is a schematic illustration of the process of depositing liquid polymer onto the lens forming pattern and curing the liquid polymer.

FIGS. 4a-4c show some sequence diagrams illustrating a detail process of above-mentioned steps 301-303 according to an embodiment of the invention, for manufacturing a polymer miniature lens by using lithography process. Referring to FIGS. 4a-4b, in step one, provide a substrate 41, which is a transparent glass wafer. The substrate 41 is cleaned with the treatment of O2 plasma, ozone, or aqueous acid solution, so the surface of the substrate 41 is adapted for laminating the lens forming pattern thereon. In step two, photoresist material 40 which is negative photoresist material and in liquid form, is provided onto the substrate surface 411 of the substrate 41 through spin-coating process. Preferably, the photoresist material 40 is a negative photoresist. Subsequently, soft baking is processed on the photoresist material 40 until the photoresist material 40 transforms liquid into solid body. In step three, photo-masks 43 which are disk shape are placed directly onto the photoresist 40, and the photo-masks 43 are metal-mask. Then the photoresist 40 and the photo-masks 43 both are exposed to light. In step four, develop the photoresist 40 until the photoresist 40 turns into the lens forming patterns 42, then hard bake the lens forming patterns 42; the lens forming patterns 42 which are annulus shapes with open holes 421 formed in the center are obtained. The lens forming patterns 42 are formed on the substrate surface 411 of substrate 41. The annulus shape and the thickness of 13 um of the lens forming patterns 42 are suitable to confine the liquid polymer which to be dispensed thereto. In other embodiment according to the invention, the lens forming pattern is a layer of photoresist material, which is in solid form, applied onto the substrate surface by lithography process, stencil printing, silk printing, or stamp printing.

Figure 5A:
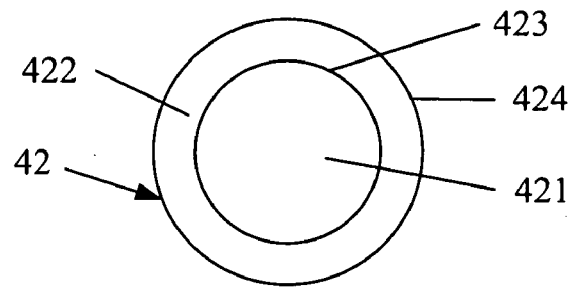
FIG. 5a is a schematic illustration of the lens forming pattern which is annulus shape.

In conjunction with FIG. 5a, according to the embodiment, the lens forming pattern 42 has a periphery area 422 and an interior area, and most portion of the periphery area 422 has a property of confining liquid polymer, while the interior area which is a open hole 421 exposing the substrate surface 411 of the substrate 41. Detailedly, the lens forming pattern 42 is a photoresist ring which has an outer boundary 424 and an inner boundary 423. The open hole 421 is defined by the inner boundary 423, while the periphery area 422 is the area between the outer boundary 424 and the inner boundary 423.

Referring to FIGS. 4a-4c, in step five, polymer 44a which is in liquid form in step five is precisely controlled to deposit onto the lens forming patterns 42. The polymer 44a is low-shrinkage and light curable transparent thermoset polymer, which is deposited into the open holes 421 of the lens forming patterns 42 and covered the open holes 421. The open hole 421 enables the polymer 44a directly contact with the substrate surface 411 of the substrate 41. The polymer 44a is confined to the lens forming patterns 42, that is to say, the lens forming patterns 42 make the polymer 44a just exit thereon, without exiting outside the perimeter of the lens forming patterns 42. Optionally, the polymer 44a could be epoxy, silicone or elastomer. By controlling process parameter, and optimizing thickness of the photo-resist and viscosity of the liquid, the perimeter of the polymer 44a is defined by the periphery area 422, and the polymer 44a directly contacts with the substrate surface 411 of the substrate 41 through the interior area which is the open hole 421. Detailedly, the dispensing process of the polymer 44a consists of two steps, namely, the pick-up step and stamping step. The pick-up step is done by using a circular rod 45 to pick up the polymer 44a in form of droplet, with the diameter of the circular rod 45 smaller than that of the lens forming pattern 42. And the polymer 44a is adhered to the tip of the circular rod 45. The stamping step is making the circular rod 45 in temporary contacting with the substrate surface 411 of the substrate 41, which is in the open hole 421 of the lens forming pattern 42, then the polymer 44a which adheres to the tip of the circular rod 45 can be transferred onto the lens forming pattern 42. In step six, after the polymer 44a following its own surface tension to reach the equilibrium shape in the form of spherical droplet, the light is provided to illuminate onto the polymer 44a till solidified. So far, the polymer 44a is transformed into polymer miniature lens 44. In this embodiment, the refractive index of the polymer miniature lens 44 is range from 1.4 to 1.6.

After the above-mentioned step one to step six, referring to FIGS. 4b-4c and 5a, the polymer miniature lens 44 with the perimeter thereof defined by the periphery area 422 of the lens forming pattern 42, is obtained. Because of setting the lens forming pattern 42 precisely, the position and dimension of the polymer miniature lens 44 are also precisely controlled. Moreover, the polymer miniature lens 44 has a better adhesion contacting with the substrate surface 411, hence the reliability and the transparency of the polymer miniature lens 44 are improved.

Figure 5B:
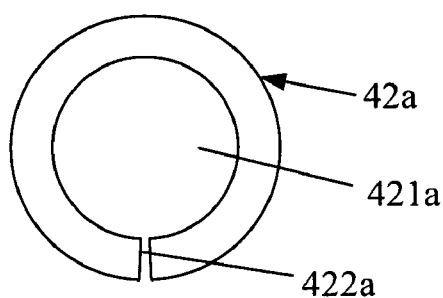
FIG. 5b is a schematic illustration of the lens forming pattern with a notch formed therein.
Figure 5C:
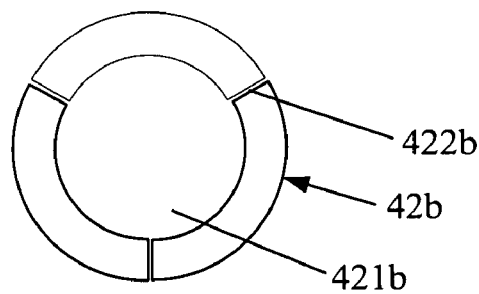
FIG. 5c is a schematic illustration of the lens forming pattern with three notches formed therein.
Figure 5D:
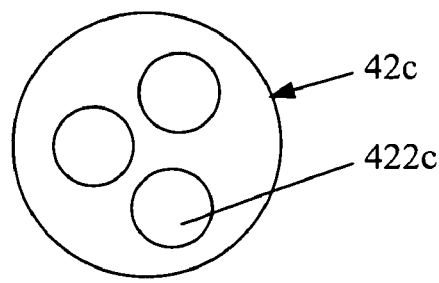
FIG. 5d is a schematic illustration of the lens forming pattern with three through holes formed therein.

FIGS. 5a-5d demonstrate the lens forming pattern 42 shown in FIG. 4 in different shapes forms. Referring to FIG. 5a, the lens forming pattern 42 is annulus with a disk-shape open hole 421 formed therein. Referring to FIG. 5b, the lens forming pattern 42a is annulus shape having a notch 422a formed therein and a disk-shape open hole 421a formed therein. Referring to FIG. 5c, the lens forming pattern 42b is annulus shape having three notches 422b formed therein and a disk-shape open hole 421b formed therein. Referring to FIG. 5d, the lens forming pattern 42c is disk shape having three through holes 422c formed therein. Referring to FIGS. 4-5, the polymer miniature lens 44 mounted on the lens forming pattern 42c and directly contacts with the substrate surface 411 of the substrate 41 through three through holes 422c.

Figure 6A:
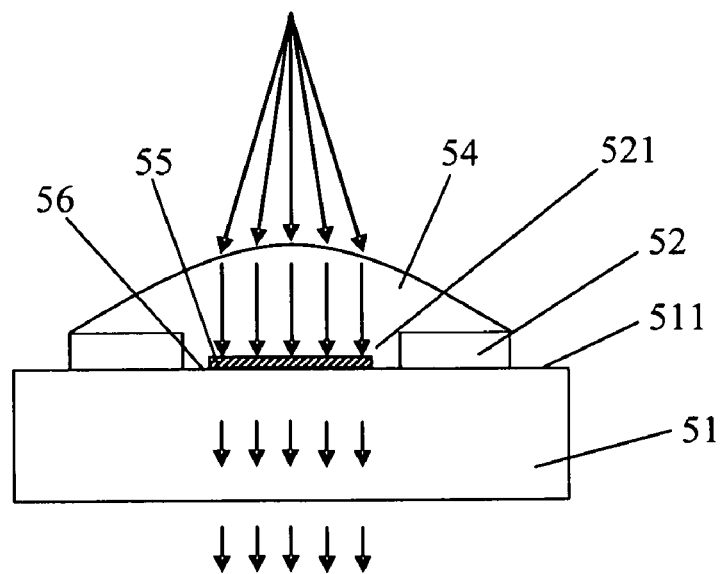
FIG. 6a is a schematic illustration of the lens forming pattern with a semi-transparent pattern therein.

FIG. 6a illustrates a polymer miniature lens 54 formed on the substrate 51, with the polymer miniature lens 54 confined to the lens forming pattern 52. The lens forming pattern 52 is annulus shape with a disk-shape open hole 521 formed therein. The structure of the polymer miniature lens 54 and the lens forming pattern 52 are similar to that of the polymer miniature lens 44 and the lens forming pattern 42, except that the lens forming pattern 52 possesses a semi-transparent pattern 55. The semi-transparent pattern 55, which is located in the disk-shape open hole 521 and in the center of the lens forming pattern 52, yet exposing portion of substrate 56, is formed on the substrate surface 511 of the substrate 51. When the beam emitted from the source irradiating to the polymer 54, the beam goes through the semi-transparent pattern 55, so the beam converts into attenuated beams.

Figure 6B:
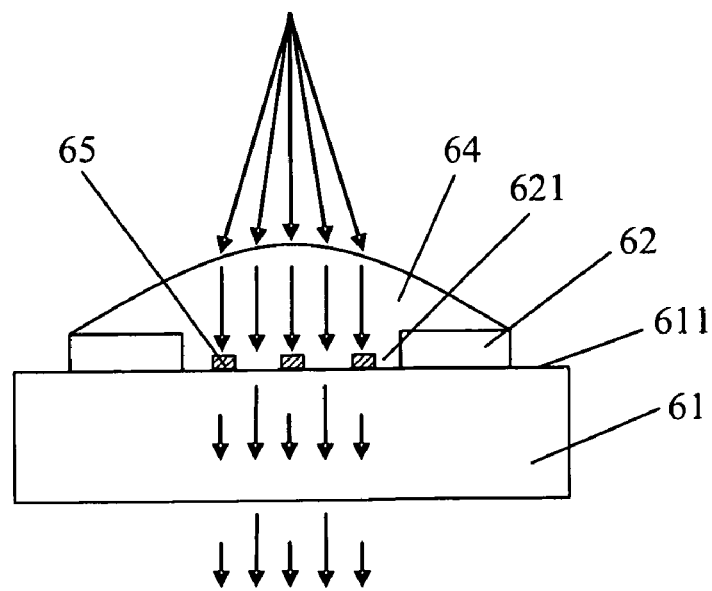
FIG. 6b is a schematic illustration of the lens forming pattern with a spatial filtering pattern therein.

FIG. 6b illustrates a polymer miniature lens 64 formed on the substrate 61, with the polymer miniature lens 64 confined to the lens forming pattern 62. The lens forming pattern 62 is annulus shape with a disk-shape open hole 621 formed therein. The structure of the polymer miniature lens 64 and the lens forming pattern 62 are similar to that of the polymer miniature lens 54 and the lens forming pattern 52, except that the lens forming pattern 62 possesses a spatial filtering pattern 65. The spatial filtering pattern 65, which is located in the disk-shape open hole 621 and in the center of the lens forming pattern 62, is formed on the substrate surface 611 of the substrate 61. When the beam emitted from the source irradiating to the polymer 64, the beam goes through the spatial filtering pattern 65, so the beam converts into spatial modulated beams.

Figure 7A:
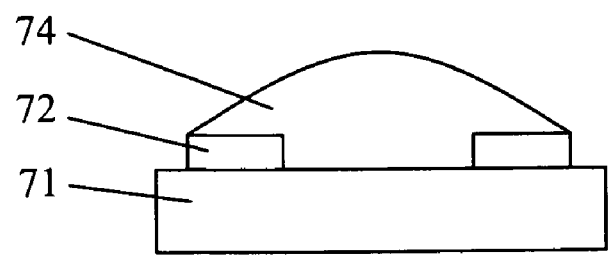
FIG. 7a is a schematic illustration of the polymer miniature lens with the lens forming pattern formed thereon according to an embodiment of the invention.
Figure 7B:
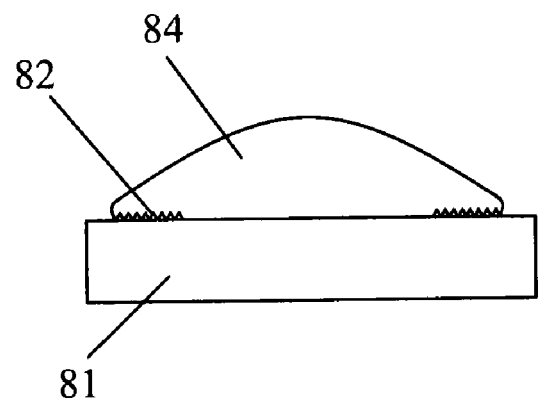
FIG. 7b is a schematic illustration of the polymer miniature lens with the lens forming pattern formed thereon according to another embodiment of the invention.
Figure 7C:
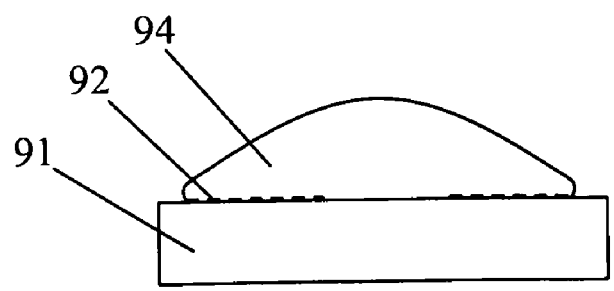
FIG. 7c is a schematic illustration of the polymer miniature lens with the lens forming pattern formed thereon according to still another embodiment of the invention.

FIGS. 7a-7c illustrate three polymer miniature lenses formed on the substrate according to the embodiments. Referring to FIG. 7a, the structure of the polymer miniature lens 74 is identical with that of the polymer miniature lens 44, but the lens forming pattern 72 is formed on the substrate 71 by modifying the surface of the substrate 71 with an embossment against the polymer miniature lens 74. Referring to FIG. 7b, the structure of the polymer miniature lens 84 is identical with that of the polymer miniature lens 74, but the lens forming pattern 82 is formed on the substrate 81 by modifying the surface texture of the substrate 81 against the polymer miniature lens 84. Referring to FIG. 7c, the structure of the polymer miniature lens 94 is identical with that of the polymer miniature lens 74, except that the lens forming pattern 92 is formed on the substrate 91 by modifying the surface of the substrate 91 with a wettability against the polymer miniature lens 94.

Figure 8:
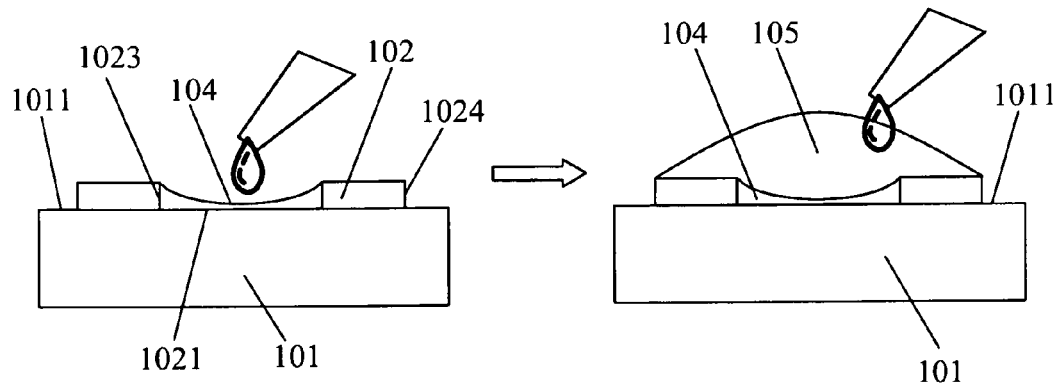
FIG. 8 is a sequence diagram illustrating a process of manufacturing the polymer miniature lens with two kinds of polymer.

FIG. 8 demonstrates a process of manufacturing a polymer miniature lens with two kinds of polymer. Referring to FIG. 8, polymer miniature lens possesses two kinds of polymer, which are the first kinds of polymer 104 and the second kinds of polymer 105. Firstly, deposit the first kind of polymer 104 which is in liquid form in the open hole 1021 of the photoresist ring 102, so that the first kind of polymer 104 is directly contacted with the substrate surface 1011 of the substrate 101. Secondly, cure the first kind of polymer 104 after the first kind of polymer 104 reaches equilibrium shape and is confined to the inner boundary 1023, then, the light is provided to illuminate onto the first kind of polymer 104 until the first kind of polymer 104 turns to solid body; Thirdly, deposit the second kind of polymer 105 in liquid form onto the first kind of polymer 104 and the entire photoresist ring 102; and cure the second kind of liquid polymer 105 after the second kind of polymer 105 reaches equilibrium shape and is confined to the outer boundary 1024. Then, the light is provided to illuminate onto the second kind of polymer 105 until the second kind of polymer 105 turns to solid body.

Figure 9A:
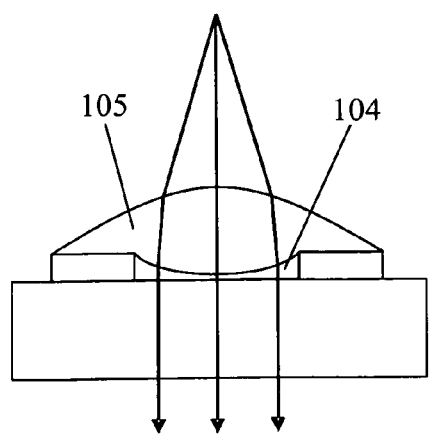
FIG. 9a is a schematic illustration of the polymer miniature lens with two kinds of polymer according to an embodiment of the invention.
Figure 9B:
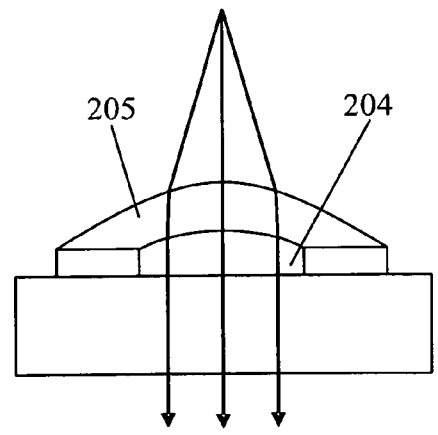
FIG. 9b is a schematic illustration of the polymer miniature lens with two kinds of polymer according to another embodiment of the invention.

FIG. 9a demonstrates the polymer miniature lens as shown in FIG. 8 with two kind of polymer, the first kind of polymer 104 forms a concave curvature surface with the second of polymer 105 laminating thereon. FIG. 9b demonstrates another polymer miniature lens. The method for manufacturing the polymer miniature lens shown in FIG. 9b is similar to the method for manufacturing the polymer miniature lens shown in FIG. 8, except that the shape of the first kind of polymer 204 of the miniature lens 200 forms a convex curvature surface thereof, with the second of polymer 205 laminating thereon. Preferably, referring to FIG. 9a the refractive index of the first polymer 104 is smaller than that of the second polymer 105; referring to 9b, the refractive index of the first polymer 204 is larger than that of the second polymer 205. Therefore, the miniature lens with two polymers according to the embodiments shown in FIGS. 9a-9b reduce spherical aberration of the polymer miniature lens, so better parallel beam is obtained.

Figure 10:
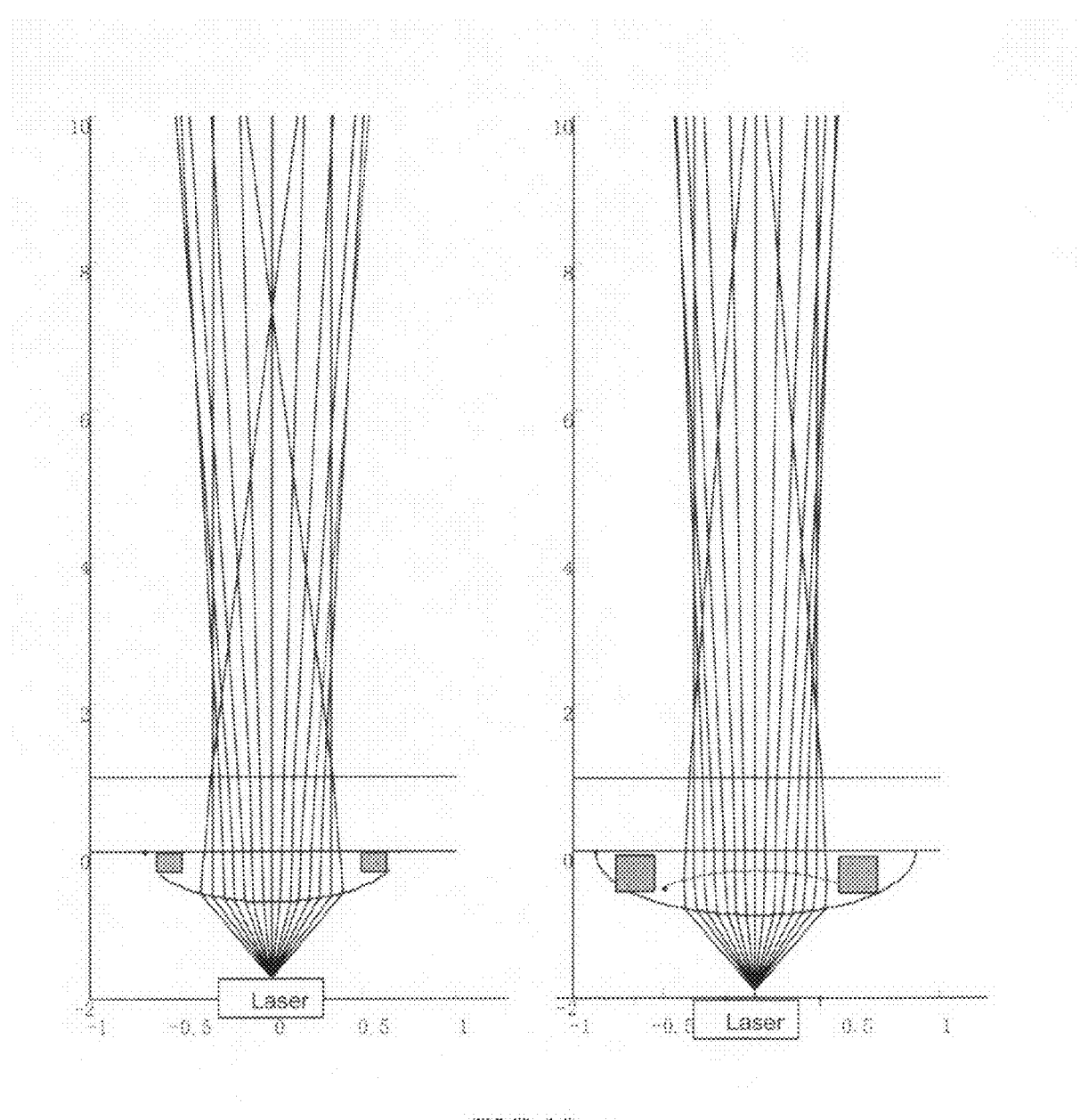
FIG. 10 is a schematic diagram of ray-tracing of the polymer miniature lens according to the embodiment of the invention.

FIG. 10 is a schematic diagram of ray-tracing of the polymer miniature lens shown in FIG. 9a. The diagram on the left demonstrates the ray-tracing of the polymer miniature lens with one single kind of polymer. The diagram on the right demonstrates the ray-tracing of the polymer miniature lens with two kind of polymers, the beams travels through two spherical curvature interfaces, which are respectively formed between the air and the second polymer and between the second polymer and the first polymer with the reduced spherical aberration, a better collimated beam is formed than that in the left diagram.

Figures 11, 12:
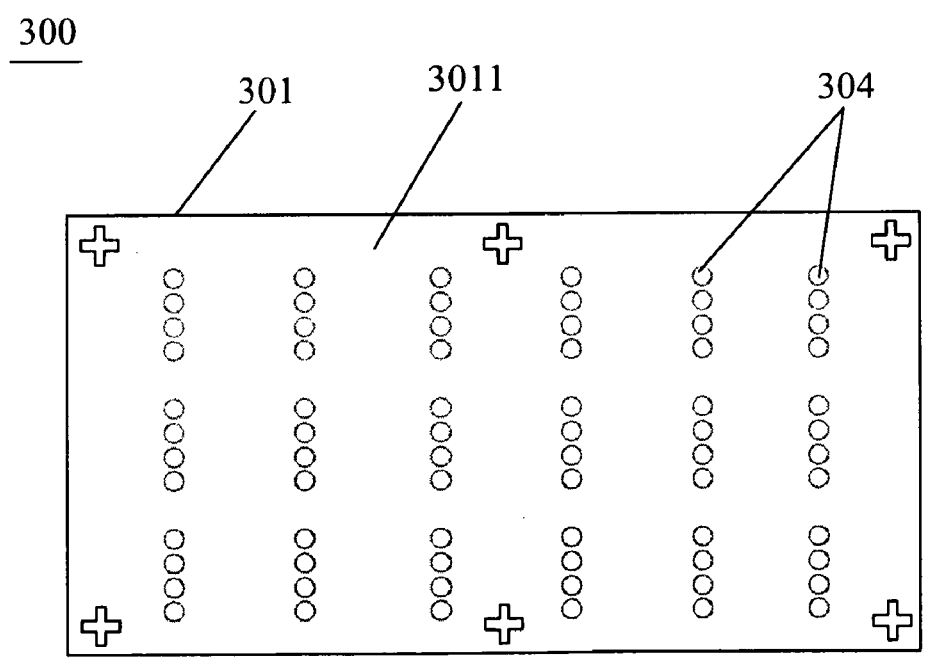
FIG. 11 is a parameter table associated with the polymer miniature lens with two kinds of polymer used in the ray-tracing model.
FIG. 12 is a schematic illustration of a collimator according to the embodiment of the invention.

FIG. 11 is a parameter table associated with the polymer miniature lens with two kinds polymers used in the ray-tracing model in FIG. 10. The corresponding numerical parameters and results are summarized in this parameters table. An ideally collimated beam will have its collimation error equal to zero. From the parameters table, the smallest polymer miniature lens error is obtained from simple polymer miniature lens is 1.55 deg, while optimized result from the improved polymer miniature lens having two kind of polymer can reduce the error to 1.04 deg.

FIG. 12 is a schematic illustration of a collimator. The collimator 300 comprises a substrate 301 having a substrate surface 3011; a plurality of lens forming pattern (not shown) formed on the substrate surface 3011 of the substrate 301, each lens forming pattern having a periphery area and an interior area, most portion of the periphery area having a property of confining liquid polymer, while the interior area having at least one portion exposing the substrate surface 3011 of the substrate 301; a plurality of polymer miniature lenses 304 formed on the lens forming pattern respectively, the perimeter of the polymer miniature lens being defined by the periphery area, and the polymer miniature lens 304 directly contacting with the substrate surface 3011 of the substrate 301 through the interior area.

FIG. 13 is a parameter table associated with the diameter deviation of the miniature lenses of the collimator 300 shown in FIG. 12. The testing results of ten polymer miniature lenses of the collimator 300 are summarized in this parameters table. The dimensions of the lens forming patterns are measured by an optical microscope with image recognition before dispensing of liquid polymer thereto. The measured diameter of the lens forming pattern is slightly larger than that of the photomask, whereas measured diameter of the polymer miniature lenses are closed to that of the lens forming pattern as shown in FIG. 13. The testing parameters show that precise miniature lens can be manufactured by using the method according to the embodiments of the present invention.

FIG. 14 a parameter table associated with the miniature lenses of the collimator 300 shown in FIG. 12 before and after the reflow process. High temperature endurance of the polymer miniature lenses are testified by comparing the polymer miniature lenses profiles, before and after going through normal Surface Mounting Technology (SMT) reflow process with maximum temperature 260° C. (duration of 10-second). Results are summarized in this parameter table, and the parameter table shows that no noticeable change in the polymer miniature lens profile before and after the processes.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method for manufacturing a polymer miniature lens on a substrate, the method comprising:

forming a lens forming pattern on the surface of the substrate, the lens forming pattern having a periphery area and an interior area, most portion of the periphery area having a property of confining liquid polymer, while the interior area having at least one portion exposing the surface of the substrate;

depositing liquid polymer onto the lens forming pattern; and curing the liquid polymer after the liquid polymer reaches equilibrium shape and is confined to the periphery area;

wherein the perimeter of the polymer miniature lens is defined by the periphery area; and the polymer miniature lens directly contacts with the substrate surface through the interior area, and wherein the lens forming pattern is a photoresist ring which has an outer boundary, an inner boundary, and an open hole defined by the inner boundary, said periphery area is the area between the outer boundary and the inner boundary, and said interior area is the open hole.

2. The method for manufacturing a polymer miniature lens according to claim 1, wherein the liquid polymer comprises a first kind of liquid polymer and a second kind of liquid polymer, and the steps of depositing liquid polymer onto the lens forming pattern and curing the liquid polymer is performed by:

depositing the first kind of liquid polymer in the open hole of the photoresist ring;

curing the first kind of liquid polymer after the first kind of liquid polymer reaches equilibrium shape and is confined to the inner boundary;

depositing the second kind of liquid polymer onto the first kind of polymer and the entire photoresist ring; and curing the second kind of liquid polymer after the second kind of liquid polymer reaches equilibrium shape and is confined to the outer boundary.

3. The method for manufacturing a polymer miniature lens according to claim 2, wherein the refractive index of the first kind of polymer is different from that of the second kind of polymer.

4. The method for manufacturing a polymer miniature lens according to claim 1, further comprising a step of forming a semi-transparent pattern or a spatial filtering pattern on the substrate surface and locating the semi-transparent pattern or the spatial filtering pattern in the open hole of the lens forming pattern.

5. A method for manufacturing a polymer miniature lens on a substrate, the method comprising:

forming a lens forming pattern on the surface of the substrate, the lens forming pattern having a periphery area and an interior area, most portion of the periphery area having a property of confining liquid polymer, while the interior area having at least one portion exposing the surface of the substrate;

depositing liquid polymer onto the lens forming pattern; and curing the liquid polymer after the liquid polymer reaches equilibrium shape and is confined to the periphery area;

wherein the perimeter of the polymer miniature lens is defined by the periphery area, and the polymer miniature lens directly contacts with the substrate surface through the interior area, and wherein the lens forming pattern is annulus shape with at least a notch formed therein.

6. A method for manufacturing a polymer miniature lens on a substrate, the method comprising:

forming a lens forming pattern on the surface of the substrate, the lens forming pattern having a periphery area and an interior area, most portion of the periphery area having a property of confining liquid polymer, while the interior area having at least one portion exposing the surface of the substrate;

depositing liquid polymer onto the lens forming pattern; and curing the liquid polymer after the liquid polymer reaches equilibrium shape and is confined to the periphery area;

wherein the perimeter of the polymer miniature lens is defined by the periphery area, and the polymer miniature lens directly contacts with the substrate surface through the interior area, and wherein the lens forming pattern is disk shape with a plurality of through holes formed therein.

* * * * *